Aug. 14, 1934. S. A. GOTTLIEB 1,970,451
CONTAINER
Filed March 25, 1932
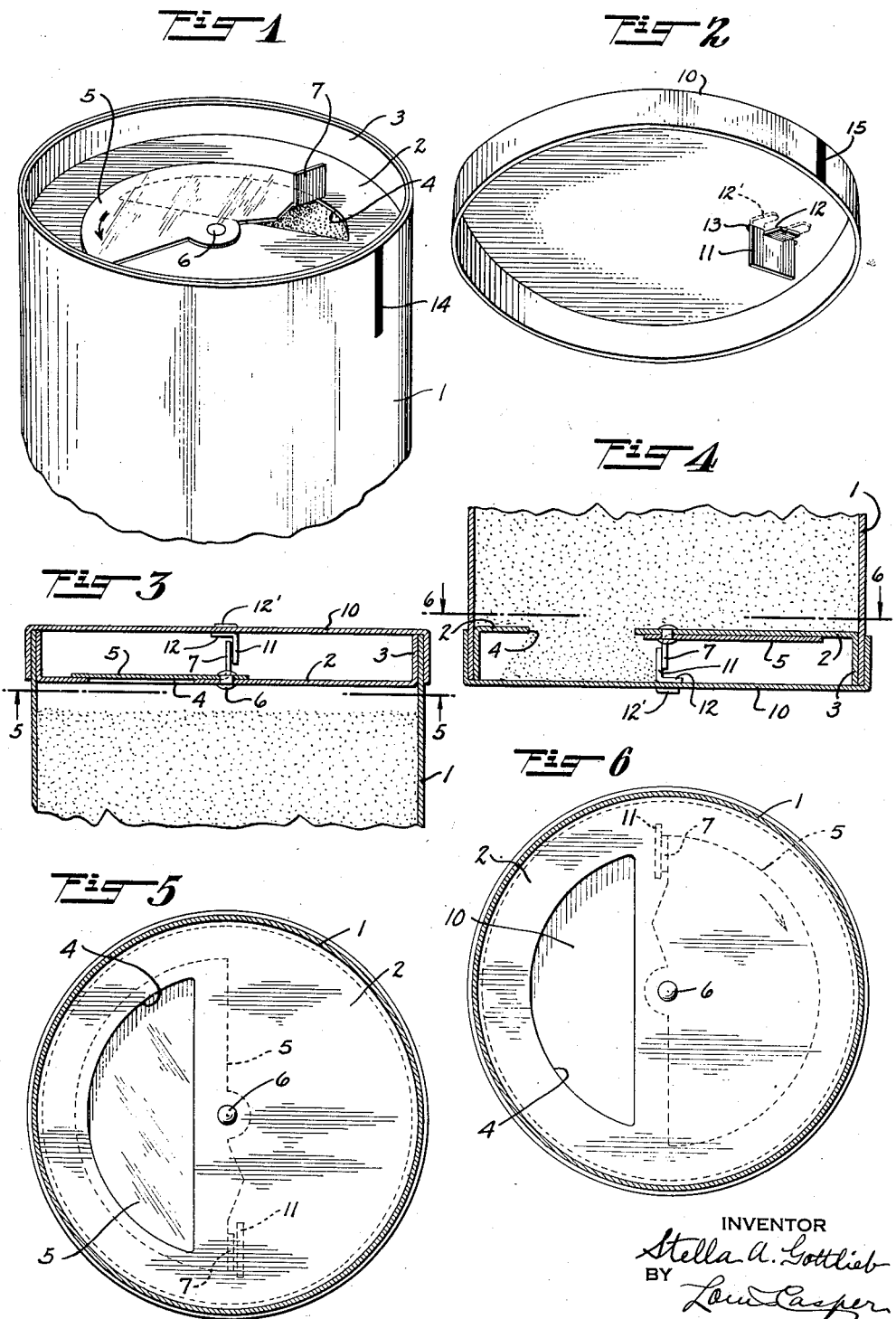
INVENTOR
Stella A. Gottlieb
BY
Lou Casper
ATTORNEY Patented Aug. 14, 1934

1,970,451

UNITED STATES PATENT OFFICE 1,970,451

CONTAINER

Stella A. Gottlieb, New York, N. Y.

Application March 25, 1932, Serial No. 601,149

6 Claims. (Cl. 221—95)

This invention relates to container devices that are capable of holding various substances especially such material that would be desirable to maintain free from air exposure. This refers particularly to food products, such as coffee, tea and so forth. Furthermore with this device it is possible to readily extract a portion of the substances contained therein in measured quantity and such extraction is made without air exposure of the remaining portion in the container proper.

This is attained in a simple and efficient manner and my invention will be clearly understood when the following description is read with reference to the accompanying drawing in which—

Fig. 1 is a perspective view of the top portion of the container device embodying my invention, showing the cover removed, and the measuring disc partially revolved (not a normal position).

Fig. 2 is a perspective view of the under side of the container cover.

Fig. 3 is a vertical section through the center of the container with the parts in closed position as when not in use.

Fig. 4 is a vertical section similar to Fig. 3, but with the container inverted as in use and the revolving disc in its half open position to allow a measured amount of material to flow from the main container into the receptacle formed by the cover.

Fig. 5 is a section taken along the line 5—5 of Fig. 3.

Fig. 6 is a section taken along the line 6—6 of Fig. 4.

Referring specifically to the figures in the drawing, 1, is the main container which may be made of any substantial material such as, strawboard, tin plate, glass, etc. The inner surface of the container proper is preferably waxed or paraffined to better hold the flavor of the contents therein. 2 is the inner top of the container which may be removable and which also acts as a measuring container.

The cover 10 may be made of glass or other transparent substance in which case inner operation of the container above the inner top may be readily observed.

4, is an opening in the inner top of the device through which the material is poured when the measuring disc 5 is turned sufficiently to expose said opening as shown in Fig. 1. In this figure the measuring disc is partially turned and as a result partially exposes the opening 4. 6, is a pivot on which the measuring disc 5 swings. 7, is a finger on the disc 5 which contacts with the actuating clip 11 on the cover 10 when the latter is placed in position as seen in Fig. 3.

12, 12' are securing clips or clamps on the actuating clip on the cover 10.

13, is a slot in the cover 10 in which the clip 11 is secured.

14, 15, are marks on the container and cover respectively to assist the operator in properly observing on the outside of the container the position of the finger 7 on the disc 5 with respect to the actuating clip 11 on the cover 10.

Setting pins or risers may be employed in addition to or in lieu of the markings 14 and 15 to further assist the accurate manipulation of the container.

Normally the container is filled with material such as coffee, tea, etc., and the cover 10 (Fig. 2) is placed in position as sectionally shown in Fig. 3.

The opening 4 in the container is normally covered by the swinging disc 5 as shown in Fig. 5.

When it is desired to extract a portion of the contents in the container, the cover 10 is revolved, the extent of such revolution being governed by observing the marks 14, 15 and their relative positions on the cover and the container respectively. The turning of the cover moves the disc 5 through the contacting of the actuating clip 11 against the finger 7 on the disc 5 which moves the latter until the opening 4 is exposed, as shown in Fig. 6.

The container is then inverted as shown in Fig. 4 which causes a portion of the contents of the former to fall through the opening 4 into the cover 10.

After this is done and before the container is restored to its normal upright position, the cover 10 is turned again thereby restoring the disc 5 to its normal position, that is, by covering the opening 4.

When the opening 4 has been securely covered, the extracted portion may either be taken from the cover while the container is in an inverted position by removing the same from the body of the container, or the container may be placed in its normal upright position, in which case the extracted portion will be held in the space above the inner top of the container.

It will thus be readily seen that it is possible to extract the contents in measured quantity (the space between the inner top 2 and the cover being the measure) without air exposure of the remaining material in the container.

This is particularly valuable when the container is used to hold coffee or the like which lose their flavor and freshness when exposed to the air.

Now having described my invention, what I claim is—

1. In a container having a closed and an open end, a flat revoluble and removable cover for said open end, marginal flanges on said cover to fit over said open end, a downwardly depending finger carried by the cover and inwardly thereof, an end wall in said container adjacent the open end and providing a measuring space between said end wall and said cover, an opening in said end wall, a disc-like closure for said opening revolubly carried by said wall, an upwardly turned portion on said disc to engage said finger on said cover and revolve said disc when said cover is revolved, and indicia on said cover and said container to indicate the position of said disc with respect to said opening.

2. In a container having a closed and an open end, a flat revoluble and removable cover for said open end, marginal flanges on said cover to fit over said open end, a downwardly depending finger carried by the cover and inwardly thereof, an end wall in said container adjacent the open end and providing a measuring space between said end wall and said cover, an opening in said end wall, a disc-like closure for said opening revolubly carried by said wall, an upwardly turned portion on said disc to engage said finger on said cover and revolve said disc when said cover is revolved.

3. In a container having a closed and an open end, a flat revoluble and removable cover for said open end, marginal flanges on said cover to fit over said open end, a downwardly depending finger carried by the cover and inwardly thereof, an end wall in said container adjacent the open end and providing a measuring space between said end wall and said cover, an opening in said end wall, a revoluble closure for said opening and an upstanding member on said closure to engage said finger and revolve said closure when said cover is revolved.

4. In a container having a closed and an open end, a flat revoluble cover for said open end, marginal flanges on said cover to fit over said open end, an end wall within said container adjacent said open end and providing a measuring space between said wall and said cover, an opening in said wall, a flat revoluble closure for said opening, a lug on said closure and a lug engaging member carried by said cover to revolve said closure when said cover is revolved.

5. In a container having a closed and an open end, a flat revoluble and removable cover for said open end, marginal flanges on said cover to fit over said open end, an end wall within said container adjacent the open end and providing a space between said end wall and said cover, an opening in said wall, a revoluble closure for said opening and co-operating means carried by said cover and said closure for revolving said closure when said cover is revolved.

6. In a container having a closed and an open end, a flat revoluble and removable cover for said open end, marginal flanges on said cover to fit over said open end, an end wall in said container adjacent the open end and providing a space between said wall and said cover, an opening in said wall, a valve for said opening, and means carried by said cover for actuating said valve when said cover is revolved.

STELLA A. GOTTLIEB.